United States Patent [19]

Amtsberg

[11] 4,072,198

[45] Feb. 7, 1978

[54] HYDRAULIC ROCK DRILL

[75] Inventor: Lester A. Amtsberg, Utica, N.Y.

[73] Assignee: Chicago Pneumatic Tool Company, New York, N.Y.

[21] Appl. No.: 682,093

[22] Filed: Apr. 30, 1976

[51] Int. Cl.² .......... B23Q 5/00

[52] U.S. Cl. .......... 173/10; 91/185 R; 91/276; 173/137

[58] Field of Search .......... 91/323, 308, 189, 191, 91/276, 328; 173/10, 134, 135, 137

[56] References Cited

U.S. PATENT DOCUMENTS

| | | | |
|---|---|---|---|
| 3,687,008 | 8/1972 | Densmore | 91/276 |
| 3,866,690 | 2/1975 | Lance et al. | 91/189 |
| 3,918,532 | 11/1975 | Amstberg | 173/105 |
| 3,965,799 | 6/1976 | Juvonen et al. | 91/276 |

*Primary Examiner*—Robert Hafer
*Attorney, Agent, or Firm*—Stephen J. Rudy

[57] ABSTRACT

An hydraulic rock drill having an hydraulically reciprocable hammer piston arranged to pound an anvil carrying a drill string. A sleeve type shiftable valve periodically engaged by the piston to effect alternate application to and relief of pressurized hydraulic fluid from the piston cylinder to reciprocate the piston. A constant supply of pressurized hydraulic fluid to actuate the piston is provided by a surrounding reservoir. Hydraulic feed means responds to a predetermined displacement of the anvil relative to the housing to feed the housing relative to the work in accordance with the progress of the anvil. Hydraulic means serves to cushion rebounding actions of the anvil; and means is provided to apply cooling fluid to the sliding surfaces of the tool during its operation.

18 Claims, 10 Drawing Figures

HYDRAULIC ROCK DRILL

BACKGROUND OF THE INVENTION

This invention relates to improvements in hydraulic rock drills of a type in which a hammer piston is hydraulically reciprocable to pound an anvil carrying a drill string, and of a type designed to be automatically fed along a channel as the work progresses.

An advantageous feature of the invention is a sleeve type cycle valve within the piston cylinder which cycles during operation of the tool to control the application and relief of pressure fluid relative to the piston to effect reciprocating action of the latter. A particular advantage of the valve is that it does not close a supply port feeding operating pressurized hydraulic fluid to the piston until at about the moment of completion of the power stroke; and it functions to open the supply port just before the piston has completed its return stroke. This mode of operation enables the piston to have the full force of the operating fluid right up to the time of impact on a power stroke; and to be ready for a power stroke as soon as its return stroke is completed.

Another feature of the invention is a slidable spline coupling between the piston and the anvil which enables pounding of the anvil as the piston reciprocates, and also enables rotation of the piston to be transmitted directly to the anvil, whereby the usual rotation transmitting gear train is eliminated.

A further feature of the invention is a beneficial arrangement of components whereby lubrication and cooling of sliding anvil and piston surfaces is provided by circulating oil of the hydraulic system. This feature promotes greater life of sliding surfaces and seals.

Another feature is an hydraulic shock absorbing thrust bearing arrangement which dampens rebounding actions of the anvil following impact, and has the advantage of returning to the anvil energy that would otherwise be wasted in housing vibrations.

And, a still further feature of the invention is automatic feed mechanism which functions to maintain an optimum amount of anvil travel independently of operator judgement.

BRIEF DESCRIPTION OF THE DRAWING

In the accompanying drawing comprising FIGS. 1-10.

DESCRIPTION OF PREFERRED EMBODIMENT

Figures 1, 2, 3:
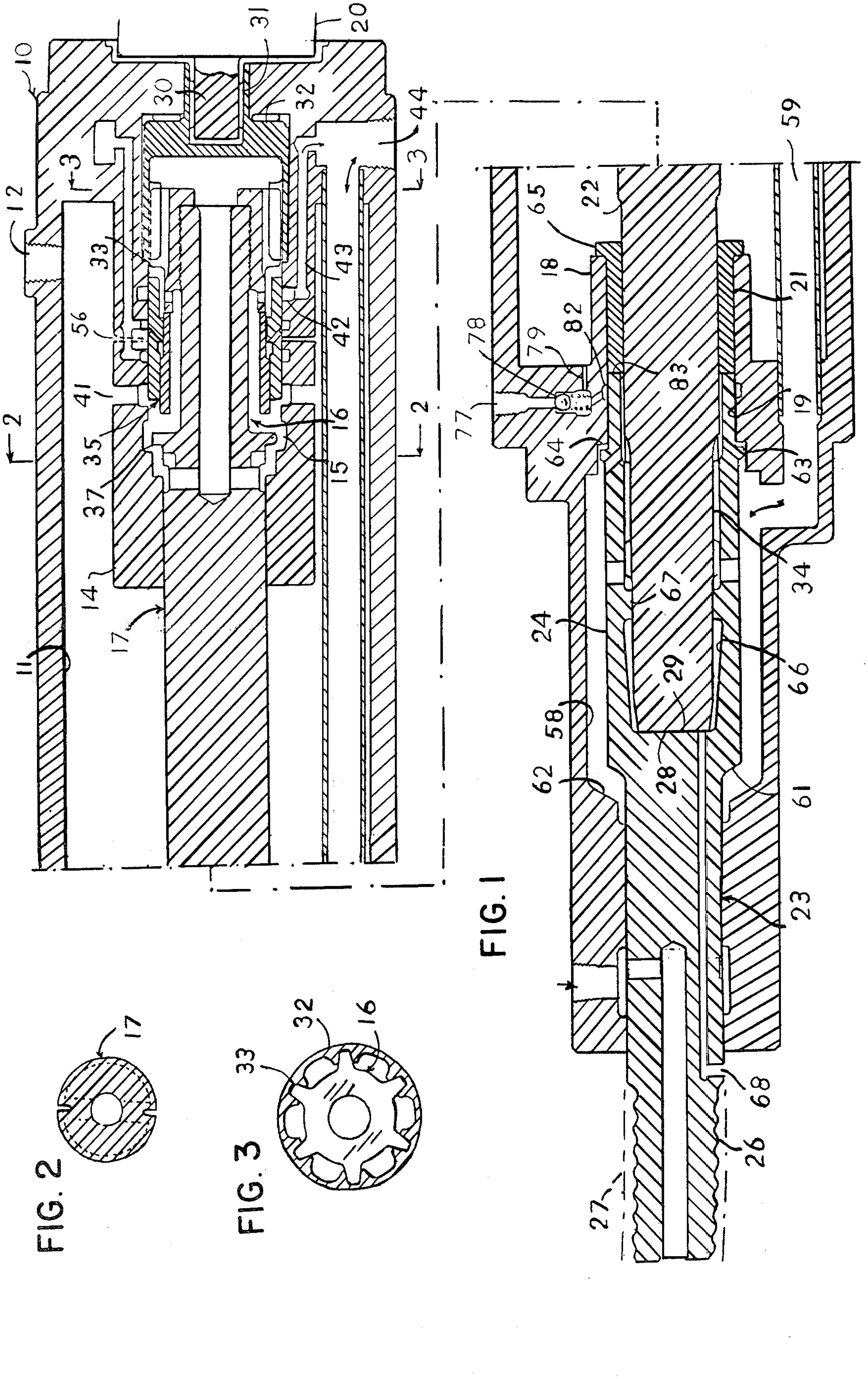
FIG. 1 is a sectional view of an hydraulic rock drill tool embodying the invention.
FIG. 2 is a cross section through the piston on line 2—2 of FIG. 1.
FIG. 3 is a cross section taken on line 3—3 of FIG. 1 showing the splined connection between the piston and the adapter.

The tool shown in the accompanying drawing as embodying the invention includes a general housing 10 having an internal chamber defining a pressure oil reservoir 11. The reservoir contains enough oil so as to serve as an accumulator. The reservoir is constantly pressurized with oil being fed to it through an inlet 12 by means of an externally connected pump system, not shown, associated with an oil supply tank or sump.

An internal rear tubular portion 14 of the housing extending forwardly partway into the reservoir is provided with a bore defining a piston cylinder 15 in which a tail portion or head, generally indicated at 16, of a hammer piston 17 is reciprocable. An opposite internal forward tubular portion 18 of the housing extending rearwardly partway into the reservoir is provided with a bore 19 fitted with a bushing 21 in which a forward shank portion of the piston is slidably supported as the piston reciprocates.

In the spacing separating the opposed ends of the internal tubular housing portions 14 and 18 a central portion of the piston extends directly through the pressurized oil in the reservoir; and an annular piston return shoulder 22 defined by a reduced forward diameter portion of this central section of the piston is constantly subjected to reservoir oil pressure urging the piston in a rearward or return direction. This passing of the shank of the piston through the reservoir fluid aids in cooling the piston as well as in circulating the fluid to lubricate associated sliding parts.

Upon application of reservoir pressure oil to the head 16 of the piston, which provides a relatively greater diameter differential surface area than the return shoulder 22, the piston is adapted to be forcefully driven forwardly on a power stroke to impact against an anvil 23. The anvil is supported in the housing for relative axial sliding and rotatable movement. A tubular tail portion 24 of the anvil extending slidably into the housing portion 18 supports the anvil at its rear; and a shank portion extending slidably through a front end of the housing supports the anvil at its forward end. An externally projecting threaded end 26 of the anvil is adapted to have a conventional drill string 27 (broken line) attached to it. The drill string carries the usual rock bit at its end.

The tail portion 24 of the anvil provides an internal recess into which a squared hammer end 28 of the piston is slidably received and is adapted to pound against the back or bottom 29 of the recess as the piston reciprocates.

A rotary motor 20 mounted to the rear of the housing is operable independently of the reciprocating action of the piston to transmit rotation to the latter. To this end, a drive shaft 30 of the motor disposed in axial alignment with the piston has a splined drive connection 31 with an adapter 32. The adapter is rotatably supported in the housing and restrained against relative axial movement. It has an internal splined socket in which splines 33 of a tail end of the piston have a sliding connection. By means of this construction, rotation of the motor is transmitted to the piston; and the piston is axially reciprocable relative to the adapter.

The piston in turn has a sliding spline drive connection at 34 directly with the anvil, whereby the anvil and piston are axially slidable relative to one another, and whereby rotation of the piston is transmitted directly to the anvil without requirement of a gear train.

A sleeve type cycle valve unit 35 (FIGS. 1, 4-9) is arranged in the piston cylinder in coaxial surrounding relation to the head portion of the piston. It is axially slidable in a reduced diameter area or groove 36 (best seen in FIG. 4) formed about the piston. The groove has an annular driving shoulder 37 at one end. At the other end of the groove are the shoulders of the splines 33 of the piston, and a second shoulder 38 defined by an annular forwardly extending flange 39 of the piston. The valve unit is operable to cause pressure oil from the reservoir to be alternately applied to and relieved from the piston cylinder so as to cause the piston to reciprocate. The valve unit is slidable relative to a supply port 41 (defined by an annulus and a group of radial ports) connecting the reservoir directly with the piston cylinder; and is slidable relative to a return port 42 (defined by an annulus and a radial port) connecting through a restricted return passage 43 with a sump main return line 44. When the supply port 41 is open to the piston cylinder, reservoir pressure fluid is applied to the piston causing it to move forcefully on a forward stroke; and when the piston cylinder is opened to the return port 42, the pressure fluid is relieved to the return line, causing the piston to be returned under pressure of reservoir fluid acting on the return forward shoulder 22 of the piston.

The valve unit comprises an open ended cylindrical sleeve valve member 45, and an open ended cylindrical inner sleeve driving member 46. Sleeve 46 has two different sized outer diameters 47, 48 which have a sliding fit in mating bores or different sized inner diameters 49, 51 of the valve 45. An internal annular groove in the valve adjacent the juncture of its inner diameters defines with the surface of the sleeve an expandible cavity 52. The latter connects by means of holes 53 with an annular groove at the surface of the valve. As the valve shifts forwardly or rearwardly during reciprocating action of the piston, holes 53 are caused to register cavity 52 with one or the other of a pair of relief ports 54, 55, or with restricted pressure oil feed holes 56. The latter connect directly with the reservoir. The relief ports connect through passages with the main return line 44. The difference between the two mating diameter areas of the sleeve and valve creates a driving effect of the sleeve upon the valve so as to force the latter in one direction or the other relative to the piston shoulders 37 and 38, depending upon the differential developing between pressure in the cavity 52 and pressure developing within the piston cylinder. Hydraulic pressure develops in or is relieved from cavity 52 accordingly as the latter registers with the feed holes 56 or with one of the relief ports 54/55. The effect of the cavity together with pressure oil flowing into and out of it is that of a hydraulic coupling between the sleeve and the valve controlling their movement relative to the piston. Accordingly, the valve unit and piston cooperate in their relative movements to cause reservoir pressure oil to be alternately applied to and relieved from the piston to effect reciprocation of the latter.

The manner in which this cooperation of the valve unit and piston occurs is illustrated progressively in FIGS. 4–9 as the piston passes through a return and power stroke cycle of operation.

Figure 4:
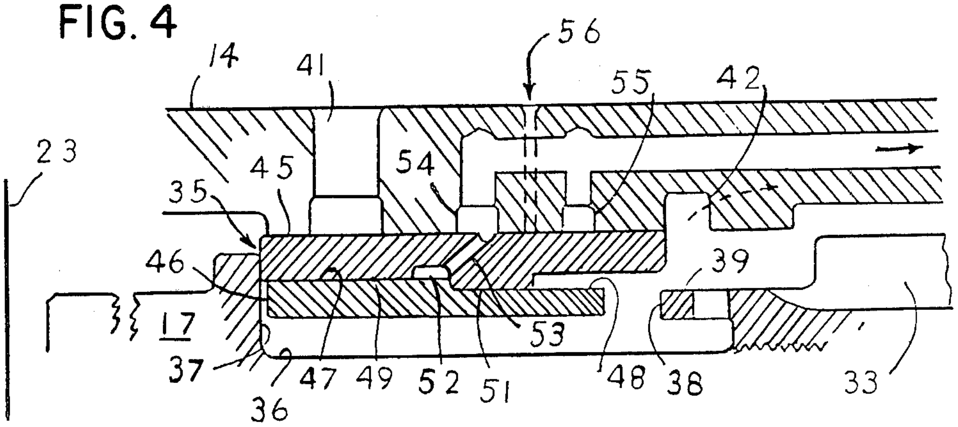
FIGS. 4-9 are progressive schematic views illustrating a cycle of operation of the piston and the associated control valve.

In FIG. 4 the valve unit 35 is shown in a position obtained in an early stage of return movement of piston 17. Reservoir pressure fluid acting at this time on the return shoulder 22 (FIG. 1) of the piston is forcing the piston on a return stroke. The valve 45 has advanced to a position where its front end abuts the driving shoulder 37 of the piston. The valve has fully opened the return port 42 to the restricted return passage 43; has fully closed the supply port 41; and it has registered cavity 52 with the forward relief port 54. Because of the near zero pressure in cavity 52 at this time, a small differential pressure in the cylinder acting at this time over the front end of sleeve 46 has forced the latter into the valve and away from the driving shoulder 37 of the piston; and a small differential pressure acting on the rear end of the valve is holding the valve in abutment with the driving shoulder. The differential pressures are due to a small pressure developing in the cylinder as pressure oil is being forced by the returning piston through the return port 42 into the restricted return line 43.

Figure 5:
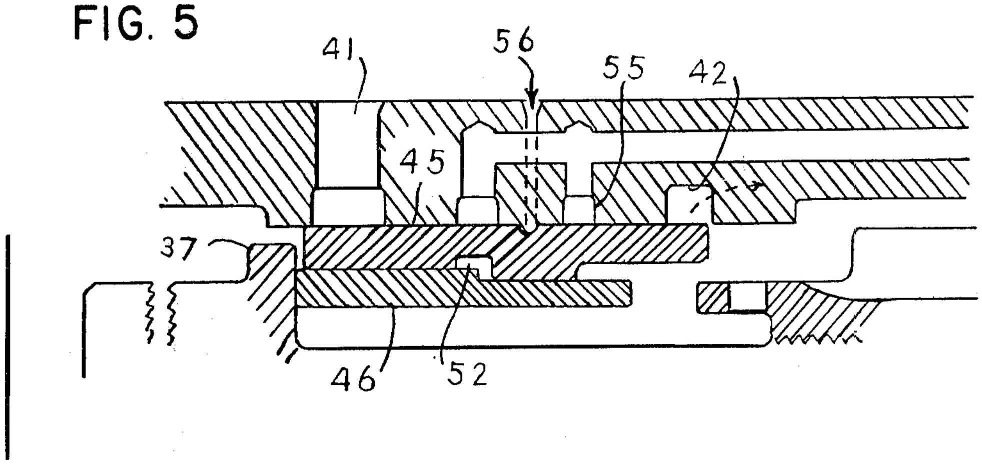

Further return of the piston advances the valve to register cavity 52 with the pressure oil feed holes 56, as in FIG. 5. At this time the return port 42 is partially closed, and the piston cylinder is substantially free of pressure. The differential hydraulic pressure developing in cavity 52 accelerates the valve rearwardly ahead of the driving shoulder 37 of the piston; and forces the valve further rearwardly to fully close over the return port and to crack open the supply port 41; and also forces the sleeve 46 in the opposite direction into abutment with the driving shoulder 37 of the piston.

Figure 6:
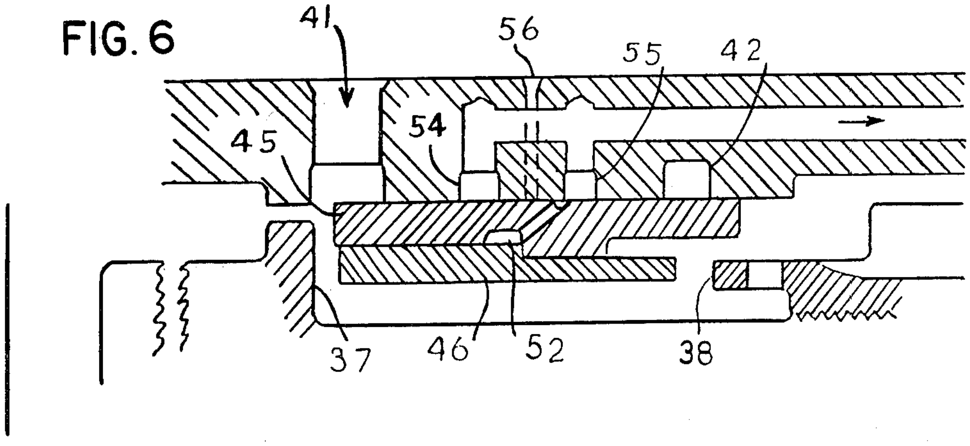
Figure 7:
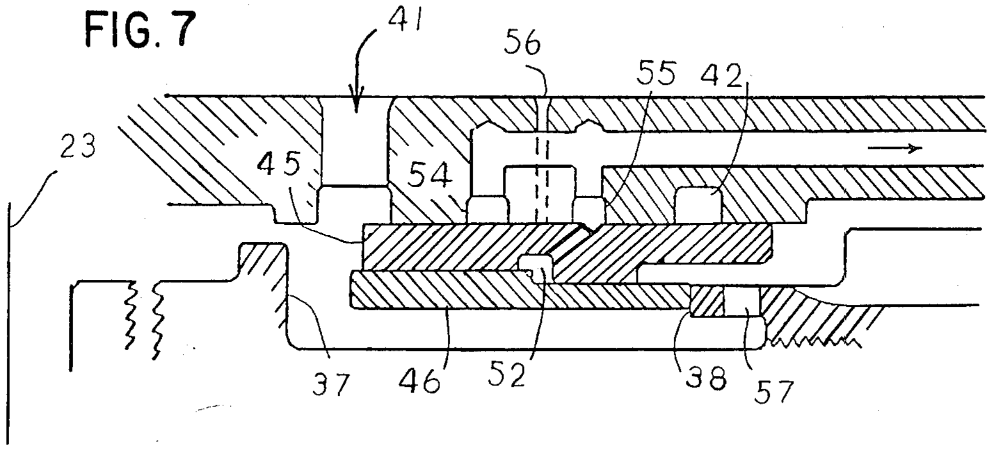
Figure 8:
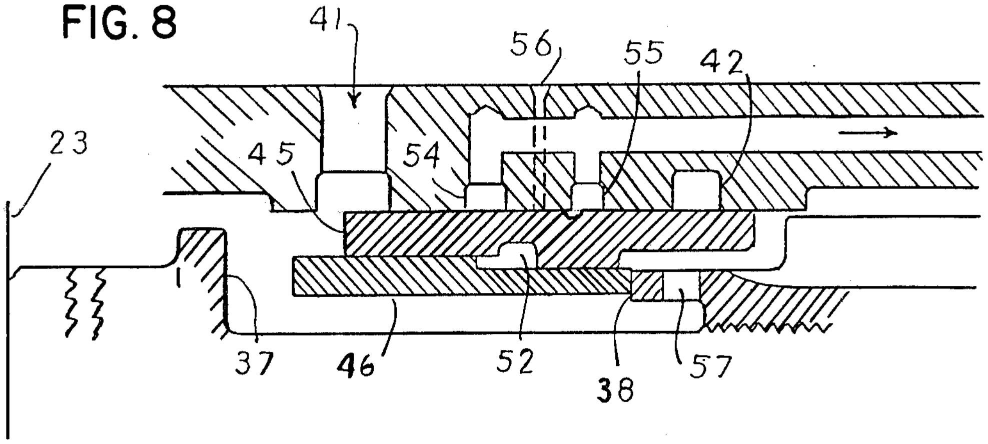
Figure 9:
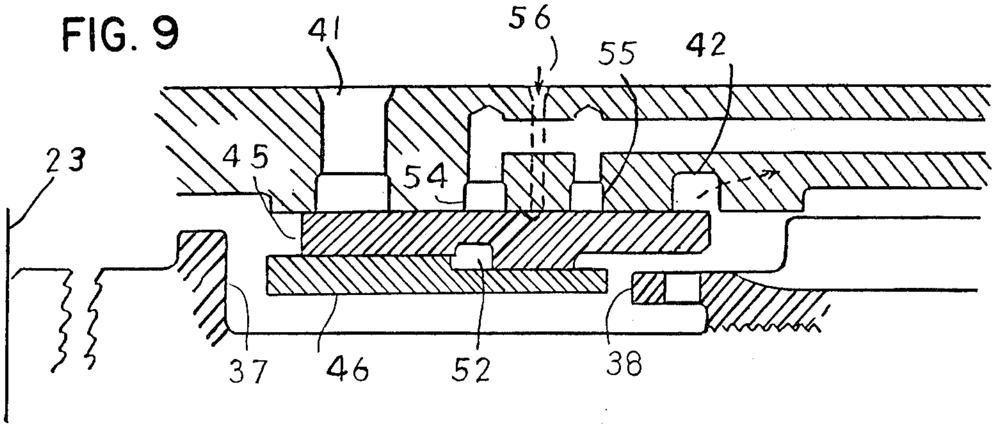

As the supply port 41 cracks open, the inrushing pressurized oil immediately acts upon the front end of valve 45 as in FIG. 6. This further accelerates the valve moving it ahead of the driving shoulder of the piston, while at the same time retarding the velocity of the piston. The rearwardly moving valve carries cavity 52 into register with the rear relief port 55. The sleeve 46 is then forced into the valve as hydraulic pressure relaxes in cavity 52, and as a differential pressure develops over the front end of the sleeve. The inrushing supply pressure acting over the driving shoulder 37 now decelerates the piston to a stop.

Supply pressure, now high in the piston cylinder, starts acceleration of the piston on a power stroke. At about this time, as in FIG. 7, the sleeve coasts into contact with the rear shoulder 38 of the advancing piston which causes the sleeve to now advance forwardly relative to the valve. This action develops a vacuum in the rapidly expanding cavity 52 in view of the restricted size of the holes 53. At this time a differential pressure developing at the rear of the valve under pressure of supply oil passing around the sleeve and through holes 57 in the piston flange decelerates the valve to a stop, as in FIG. 7, and then starts forward acceleration of the valve.

The piston is now accelerating on its power stroke faster than the valve. The sleeve, however, is being pushed by the rear shoulder of the piston ahead of the valve. Cavity 52 accordingly further expands in this action; and the valve is now being advanced toward closing of the supply port 41 by differential pressure acting over its rear, as in FIG. 8. The piston impacts against the anvil momentarily before the accelerating valve closes over the supply port 41. In this mode of operation the piston is under full supply pressure right up to the time of impact.

As the piston is arrested upon impact, the valve and sleeve, with the sleeve ahead of the valve, coast under residual kinetic energy further forwardly. The sleeve moves away from the rear piston shoulder 38; and the valve coasts to fully close the supply port and to crack open the return port, as in FIG. 9. As the valve coasts past the closing or shift point, cavity 52 is registered with oil feed holes 56 and filled with pressurized oil. The resultant pressure differential developing in cavity 52 slows the coasting advance of the valve; and the small pressure developing over the front end of the sleeve due to the slow exit of fluid through the restricted return line 43 moves the sleeve slightly rearwardly against the pressure of oil in the cavity.

However, momentum carries the valve and sleeve further forward, bringing the sleeve into contact with the driving shoulder 37 of the piston at about the time that the valve fully registers cavity 52 with the forward relief port 54. As the sleeve presses against the piston shoulder 37 it is forced inwardly of the valve, forcing oil from cavity 52 to the relief port 54. In this manner, the sleeve is cushioned relative to its engagement with the driving shoulder; and at the same time serves to dampen the forward motion of the valve. As a result, the valve is substantially decelerated to a stop at about the time it contacts the driving shoulder 37 of the piston. This action serves to avoid an undesirable rebounding or bouncing action of the valve relative to the piston.

At this time pressure will have been substantially relaxed through the now fully opened return port 42; and the piston under reservoir pressure acting on the return shoulder 22 will start its return stroke, moving the valve and sleeve together ahead of it to re-obtain the FIG. 1 condition.

It is to be noted that the sliding spline connection 33 (FIG. 1) of the rotary adapter 32 with the piston provides a generous passage between the splines for circulation of cooling oil to and from the rear end of the piston assembly.

An enlarged chamber 58 (FIG. 1) is provided in the housing in surrounding relation to the major part of the tubular tail portion 24 of the anvil. This chamber is constantly being filled with discharged oil flowing to it from a passage 59 branching off the main return line 44. The oil provides cooling lubrication to the sliding surfaces of the anvil. Oil discharged by the valve into the return line 44 flows in part over passage 59 to chamber 58. The branch connection of line 59 with the main return line prevents the fluid in chamber 58 from becoming trapped and interfering with anvil movements.

The anvil is provided with a forward annular shoulder 61 which is cooperable with a complementary internal shoulder 62 of the housing to arrest the anvil against escape from the housing, as when the drill string is being raised out of the drill hole or when the drill string suddenly breaks through a void.

The anvil is further provided with a rear annular shoulder 63 which is cooperable with an internal shoulder 64 of the housing to limit rebounding of the anvil following impact of the drill string with the work rock, and to stabilize the anvil for the next impacting action of the piston. It can be seen that rotation of the rear anvil shoulder 63 against the housing shoulder 64 in a high force rebounding action would cause rapid wearing away of the anvil shoulder. The bushing 21 has been provided to cooperate with the anvil in minimizing the force of the rebounding action of the anvil and consequent wear in this respect.

The bushing has a radial flange 65 which abuts against the internal housing extension 18. When the drill string attached to the anvil is pressed against the work rock, the rear end of the anvil abuts the bushing, as in FIG. 1, and the reservoir pressure acting on the flanged end 65 of the bushing normally limits the anvil to a position where its rear shoulder 63 is normally clear of the housing. Now, it can be seen that rebound forces transmitted to the anvil will be absorbed by the hydraulic reservoir load as small consequent displacement of the flange 65 of the bushing away from the housing extension 18 occurs. This enables the bushing, while its flange is clear of the housing, to rotate freely with the anvil for a brief period during rebound of the anvil. In this action stress and wear on the anvil shoulder 63 is minimal. Further, the energy absorbed by displacement of the bushing against the reservoir load is returned to the anvil as the bushing is next returned by the reservoir load to its original position.

The anvil at its impact receiving end 29 provides a chamber 66 into which the hammer end of the piston is received. A sliding seal fit at 67 of the housing wall with the piston serves to substantially seal out entry of oil along the piston into chamber 66. Any oil that should seep into the chamber would be rapidly drained through a relief passage 68 to the external surface of the anvil so as not to interfere with piston movements. Passage 68 opens through the anvil at a point close to the end of the housing, and thereby enables the drained oil to lubricate and cool the adjacent sliding surfaces.

It is desirable to control the amount of travel of the anvil on a work stroke relative to the housing to the limits of the shoulder 62, and to cause any subsequent travel of the anvil to be concurrent with a corresponding feeding movement of the entire tool.

Figure 10:
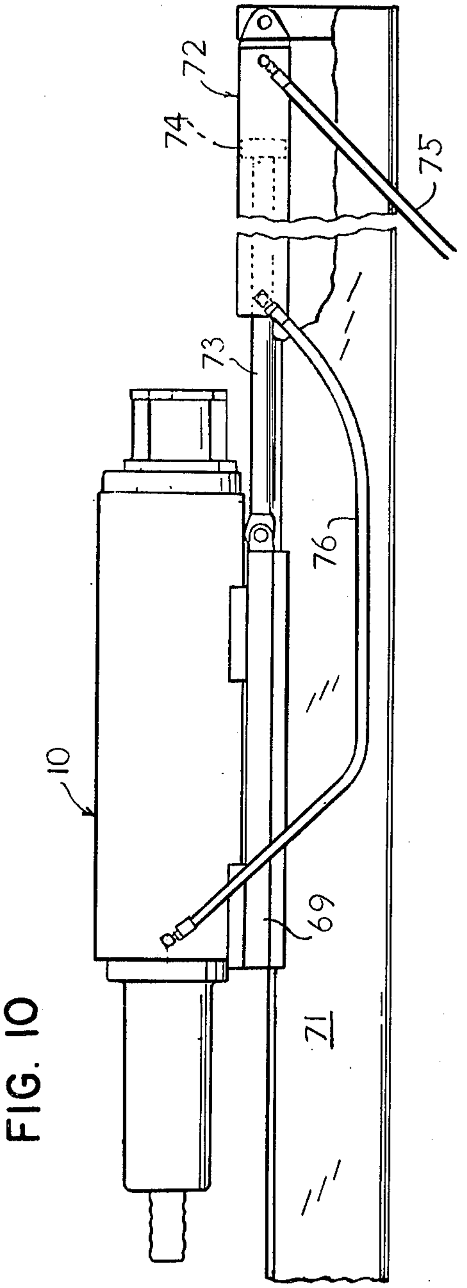
FIG. 10 is a view in side elevation of the rock drill tool and an associated hydraulic feed cylinder.

To this end, the housing 10 of the tool is clamped (FIGS. 1, 10) to a carriage 69 which is slidable upon a stationary channel 71 toward and from the work. An hydraulic feed cylinder 72 is pivoted at one end to the channel; and an extendible feed piston rod 73 is pivoted to the carriage. The area of the feed cylinder rearwardly of the feed piston 74 is connected to a constantly pressurized fluid supply line 75. The forward end of the feed cylinder is connected by a hose line 76 with a passage 77 (FIG. 1) in the housing 10 of the tool. Fluid filling the forward end of the feed cylinder is normally blocked against escape from the cylinder by means of a check valve 78 in passage 77. This serves to normally block forward movement of the feed piston. A bleed hole 79 communicating the reservoir with the underside of the check valve supplements the spring of the check valve in normally holding the check valve closed against leakage. The check valve communicates with an annular groove 82. The latter extends about the tail surface of the anvil at a predetermined distance from the rear end 83 of the anvil in the normal returned position of the anvil, that is, when the anvil is pressed against the work, as in FIG. 1.

It can be seen that after the anvil has advanced over this predetermined distance, which corresponds to slightly less than the distance indicated between the anvil and housing shoulders 61, 62, the pressure of fluid bleeding from port 79 will be relieved from the check valve as the fluid passes around the anvil end 83 and connecting passages through chamber 58 to the branch return line 59. As this occurs, the pressurized feed piston will force the blocking fluid from the front end of the feed cylinder through the check valve and connecting passages to the return line. Accordingly, the forward movement of the feed piston will feed the drill along the channel concurrently with the penetration of the drill string into the rock. As the penetration of the drill string stops, the housing 10 of the tool will advance briefly relative to the anvil until the tail end 83 of the anvil again closes over the feed groove 82 and thereby blocks further extension of the feed piston.

I claim:

1. A reciprocating hydraulic impact tool including an hydraulically reciprocable piston, a cylinder for the piston, and a sleeve type cycle valve means within the cylinder and periodically engaged by the piston for effecting alternate supply to and discharge of piston operating fluid from the cylinder, wherein hydraulic coupling means is provided to translate reciprocating motion of the piston to the valve to control acceleration of the valve in either direction in such manner that valve velocity is greater than piston velocity on a return stroke of the piston and is less than piston velocity on a power stroke of the piston.

2. An hydraulic rock drill comprising a housing, an anvil slidable in the housing having an external portion adapted to be coupled to a drill string, a hammer piston hydraulically reciprocable in the housing to pound the anvil, a cylinder for the piston, a reservoir of pressurized hydraulic fluid in the housing, a return shoulder on the piston under constant pressure of the reservoir fluid urging the piston in a return direction, the piston having within the cylinder a relatively greater diameter area than that of the shoulder, a supply port connecting the reservoir with the cylinder for applying reservoir fluid to the greater diameter area to drive the piston on a power stroke, a return port for relieving said reservoir fluid from the cylinder, an open ended cylindrical valve means slidable back and forth in the cylinder relative to the supply and return ports to effect alternate opening and closing of the supply and return ports, said valve means being periodically engaged by the piston, and means for developing differential pressures alternately at opposite ends of the valve means for sliding the latter back and forth relative to the supply and return ports.

3. An hydraulic rock drill as in claim 2, wherein the valve means comprises an inner sleeve member having two different sized outer diameters slidably fitted in mating inner bores of an outer sleeve valve member, the rear of the valve member having a greater area subject to pressure fluid in the cylinder than its front area, the sleeve having a greater front area subject to pressure fluid in the cylinder than its rear area, an annular cavity between the valve member and the sleeve member adjacent the juncture of the bores in the valve member, port means for alternately filling the cavity with reservoir pressure fluid and relieving the cavity of said fluid as the valve means slides back and forth relative to the supply and return ports.

4. An hydraulic rock drill comprising a housing, a reservoir in the housing of constantly pressurized fluid, a piston cylinder at a rear end of the housing, a bore at an opposite forward end of the housing, a hammer piston having a head portion reciprocable in the cylinder and a shank portion extending through the fluid of the reservoir and slidably supported at a front end in the bore, a shoulder area of the shank portion disposed within the fluid of the reservoir and subject to pressure of the fluid to constantly urge the piston in a return stroke direction, the head portion having a greater diameter surface area than that of the shoulder adapted upon application to it of pressure fluid from the reservoir to move the piston on a power stroke, a supply port for admitting pressure fluid from the reservoir to the cylinder, a relief port for allowing relief of said fluid from the cylinder, valve means slidable back and forth in the cylinder relative to the supply and relief ports for causing alternate opening and closing of said ports to effect reciprocation of the piston, said valve means being periodically engaged by the piston, and means responsive to motion of the piston for developing differential pressures over the valve means to cause said back and forth slidable movement of the valve means.

5. An hydraulic rock drill as in claim 4, wherein the housing has an extended front end, an anvil adapted to be coupled to a drill string is slidably supported in the front end in axial alignment with the piston, and the piston has a front hammer end impactable against the anvil as the piston reciprocates.

6. An hydraulic rock drill as in claim 5, wherein the anvil has a tubular rear portion, a forward end of the shank portion of the piston is slidable in the tubular rear portion and adapted to impact its hammer end against the bottom thereof as the piston reciprocates.

7. An hydraulic rock drill as in claim 6, wherein a rotation motor mounted to a rear end of the housing has a sliding spline rotary drive connection with the head portion of the piston whereby rotary motion is transmissable to the piston and the piston is reciprocable relative to such connection.

8. An hydraulic rock drill as in claim 7, wherein the forward end of the shank portion of the piston has a sliding spline rotary drive connection with the tubular portion of the anvil whereby rotation of the piston is transmissable directly to the anvil and whereby the anvil and the piston are slidable relative to each other.

9. An hydraulic rock drill as in claim 8, wherein a bushing disposed in bearing relation to the shank portion of the piston is slidably fitted in the bore at the forward end of the housing and has a rear flange located in the reservoir and constantly loaded by pressure fluid of the reservoir in abutment with an inner radial wall of said forward end, the anvil has a rear end wall abutting a forward end of the bushing when pressed against the work, the anvil has an annular limiting shoulder proximate its rear end normally displaced from a seating shoulder of the housing under said load of the pressure fluid, the load on the bushing serving to dampen rebound action of the anvil and impact of said limiting shoulder against the seating shoulder following impact of the anvil against the work.

10. An hydraulic rock drill as in claim 5, wherein the housing of the rock drill is slidably mounted upon a stationary channel for relative movement toward the work, an hydraulic feed cylinder is stationary with the channel, a feed piston is operable in the feed cylinder, a feed piston rod is connected to advance the housing upon advance of the feed piston in the feed cylinder, hydraulic pressure at the rear of the feed piston is constantly urging it to advance the housing, hydraulic fluid in the feed cylinder forwardly of the feed piston is normally blocking advancing movement of the latter and as a consequence of the housing, and check valve means is provided having response to a predetermined degree of outward movement of the anvil relative to the housing following impact of the latter by the hammer piston to relieve the hydraulic fluid from forwardly of the feed piston.

11. An hydraulic rock drill as in claim 10, wherein the check valve means has response to a predetermined degree of advancing movement of the housing relative to the anvil to block further relief of said blocking fluid.

12. The combination of a reservoir of constantly pressurized hydraulic fluid, a piston cylinder surrounded by the reservoir, a piston having a head reciprocable in the cylinder and having a shank of reduced diameter extending through the fluid constantly subject to pressure of the fluid urging the piston in a return direction, a supply port for admitting the fluid to the cylinder for application to the head to drive the piston on a power stroke, a return port for relieving the admitted fluid to a sump to allow return of the piston under pressure of fluid over the reduced diameter shank, an elongated peripheral groove in the piston defining a forward end shoulder and a rear end shoulder, a sleeve valve means movable in the groove between the shoulders relative to the supply and return ports, means responsive to movement of the piston on a return stroke to cause the valve means to progressively cover the return port and to uncover the supply port and responsive to movement of the piston on a power stroke to progressively cover the supply port and to uncover the return port.

13. The combination as in claim 12, wherein the forward shoulder of the piston is cooperable with the valve means on a return stroke to initiate rearward movement of the valve means to progressively uncover the supply port and to cover the return port, and hydraulic means is responsive to a predetermined extent of said rearward movement of the valve means to accelerate movement of the latter in said direction ahead of the piston.

14. The combination as in claim 13, wherein the rear shoulder of the piston is cooperable with the valve means on a power stroke of the piston to initiate forward movement of the valve means to progressively cover the supply port and to uncover the return port, and hydraulic means is responsive to a predetermined extent of said forward movement to decelerate the movement of the valve means in said direction relative to that of the piston on the power stroke.

15. A rock drill including a piston constantly pressured in a return direction having a head portion hydraulically reciprocable in a piston cylinder subject to admission of pressurized hydraulic fluid to the cylinder to move on a power stroke and adapted upon relief of said fluid from the cylinder to be pressured in a return direction, a supply port for admitting the fluid to the cylinder, a return port for relieving the fluid from the cylinder, sleeve valve means within the cylinder in surrounding relation to the head portion controlling alternate opening of one port and closing of the other, a driving shoulder on the piston having cooperation with the valve means on a return stroke of the piston to initially slide the valve means rearwardly to progressively open the supply port and to close the return port, a rear shoulder on the piston having cooperation with the valve means on a forward power stroke of the piston to slide the valve means forwardly to progressively close the supply port and to open the return port, and means responsive to an initial return movement of the valve means to accelerate the valve means ahead of the piston during the return stroke of the latter and responsive to an initial forward movement of the valve means to retard the movement of the valve means relative to the movement of the piston during the power stroke of the piston.

16. A rock drill as in claim 15, wherein the valve means includes an outer sleeve valve member having two different sized inner diameters, an inner sleeve member having two different sized outer diameters slidably mating with the inner diameters of the valve member, an annular cavity between the mating surfaces, the valve and sleeve members being adapted to move in opposite directions outwardly relative to one another upon developing hydraulic fluid pressure within the cavity, and to retract relative to one another upon relief of said fluid pressure.

17. The combination of a piston cylinder having a supply port for admission to the cylinder of pressurized hydraulic fluid and a return port for relief of the fluid from the cylinder, a piston adapted to reciprocate in the cylinder upon alternate admission to and relief of the fluid from the cylinder, a valve unit shiftable back and forth in the cylinder to cover the return port and uncover the supply port near the end of a return stroke of the piston, and to cover the supply port and uncover the return port at about the time of completion of a power forward stroke of the piston, the valve unit comprising an outer sleeve valve slidable relative to the ports to alternately cover one and uncover the other, an inner sleeve slidable in the valve having two different sized outer diameters mating with complementing different sized inner diameters of the valve whereby a forward end of the sleeve has a greater diameter area than its rear end and a rear end of the valve has a greater diameter area than its forward end; an annular cavity formed in the lesser diameter surface of the valve adjacent the larger diameter surface of the valve, holes in the valve adapted to communicate the cavity, in order, as the valve moves in a rearward direction with a forward relief port, pressurized oil feed ports, and a rearward relief port; a forward shoulder on the piston adapted to contact the forward ends of the valve unit at the commencement of a return stroke of the piston so as to impart an initial rearward directional force upon the valve unit, and a rear shoulder on the piston adapted to contact the valve unit at the commencement of a power stroke of the piston so as to impart an initial forward directional force upon the valve unit.

18. A sleeve valve unit comprising an outer sleeve valve member having first and second inner diameters the first being greater than the second, an inner sleeve member having first and second outer diameters respectively slidably mating with the first and second inner diameters of the valve member, an annular expandible cavity formed in the valve member at the juncture of its first inner diameter with its second inner diameter, a plurality of angular holes extending from the cavity through the body of the valve member to the periphery of the latter, and an annular groove in the periphery of the valve member common to the angular holes, the cavity being adapted to expand as it is pressurized with hydraulic fluid and as a consequence causing the valve and sleeve members to be hydraulically extended in opposite directions, and the valve and sleeve members being retractible relative to one another upon relief of the hydraulic fluid from the cavity as a consequence of differential pressures being applied to opposite ends of the sleeve and valve members.

* * * * *